United States Patent [19]

Freitag et al.

[11] 4,100,130

[45] Jul. 11, 1978

[54] FLAME-RESISTANT POLYCARBONATES

[75] Inventors: Dieter Freitag, Krefeld-Taar; Werner Nouverné, Krefeld, both of Germany

[73] Assignee: Bayer Aktiengesellschaft, Leverkusen, Germany

[21] Appl. No.: 592,588

[22] Filed: Jul. 2, 1975

[30] Foreign Application Priority Data

Jul. 24, 1974 [DE] Fed. Rep. of Germany ....... 2435508

[51] Int. Cl.² ................................................ C08K 3/06
[52] U.S. Cl. ......................... 260/37 PC; 260/45.7 SE
[58] Field of Search ...... 260/37 PC, 45.7 S, DIG. 24, 260/45.7 SE

[56] References Cited

U.S. PATENT DOCUMENTS

| | | | |
|---|---|---|---|
| 3,157,622 | 11/1964 | Goldberg | 260/37 PC |
| 3,228,909 | 1/1966 | Odda | 260/45.7 S |
| 3,445,408 | 5/1969 | Gabris | 260/45.7 S |
| 3,488,317 | 1/1970 | Hechelhammer et al. | 260/37 PC |
| 3,542,701 | 11/1970 | van Raamsdonk | 260/45.7 SE |
| 3,591,550 | 7/1971 | Nitschmann et al. | 260/45.7 S |
| 3,678,079 | 7/1972 | Carty et al. | 260/37 PC |
| 3,890,266 | 6/1975 | Serini et al. | 260/DIG. 24 |
| 3,912,792 | 10/1975 | Touval | 260/45.7 S |

*Primary Examiner*—Sandra M. Person
*Attorney, Agent, or Firm*—Gene Harsh; Lawrence S. Pope; Frederick H. Colen

[57] ABSTRACT

The present invention relates to flame resistant aromatic polycarbonate molding compositions which are blends containing between about 0.1 to 15 wt.% of sulphur. The blends of the present invention may also contain up to about 30 wt.% of glass fibers. The present invention also relates to improving the flame resistance of polycarbonate molding compositions by physically incorporating 0.1 to 15 wt.% of sulphur therein.

17 Claims, No Drawings

FLAME-RESISTANT POLYCARBONATES

SUMMARY OF THE INVENTION

The invention relates to flame-resistant molding compositions based on aromatic polycarbonates or based on mixtures of aromatic polycarbonates, which contain about 0.1% by weight to 15% by weight, preferably about 0.5% by weight to 7% by weight, of sulphur, relative to the total weight of polycarbonate + sulphur. The aromatic polycarbonates, which contain up to about 7% by weight of sulphur, are homogeneous, transparent compositions.

DETAILED DESCRIPTION OF THE INVENTION

Aromatic polycarbonates in the sense of the present invention are to be understood as homopolycarbonates and copolycarbonates based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and $\alpha,\alpha'$-bis-(hydroxyphenyl)-diisopropylbenzenes, as well as their nuclear-alkylated and nuclear-halogenated compounds. These and other suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846, in German Offenlegungsschriften (German Published Specifications) Nos. 1,570,703; 2,063,050; 2,063,052; 2,211,956 and 2,211,957, in French Patent Specification No. 1,561,518 and in the monograph "H. Schnell, Chemistry and Physics of Polycarbonates, Interscience Publishers, New York, 1964".

Examples of preferred bisphenols are: 4,4'-dihydroxydiphenyl, 2,2-bis-(4-hydroxhphenyl)-propane, 2,4-bis-(4-hydroxyphenyl)-2-methylbutane, 1,1-bis-(4-hydroxyphenyl)-cyclohexane, $\alpha,\alpha'$-bis-(4-hydroxyphenyl)-p-diisopropylbenzene, 2,2-bis-(3-methyl-4-hydroxyphenyl)-propane, 2,2-bis(-3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroropane, 2,2-bis-(3,5-dibromo-4-hydroxyphenyl)-propane and 1,1-bis-(4-hydroxyphenyl)-cyclohexane.

Preferred aromatic polycarbonates are those based on one or more of the bisphenols mentioned as being preferred. Particularly preferred copolycarbonates are those based on 2,2-bis-(4-hydroxyphenyl)-propane and one of the other bis-phenols mentioned as being particularly preferred. Polycarbonates based only on 2,2-bis-(4-hydroxyphenyl)-propane or 2,2-bis-(3,5-dimethyl-4-hydroxyphenyl)-propane are also particularly preferred.

The aromatic polycarbonates can be manufactured according to known processes, for example, by the melt transesterification process from bisphenols and diphenyl carbonate, and the two-phase interface process from bisphenols and phosgene, as described in the abovementioned literature.

The aromatic polycarbonates can also be branched as a result of the incorporation of minor amounts of polyhydroxy compounds, for example 0.05 – 2.0 mol% (relative to the bisphenols employed). Polycarbonates of this type are described, for example, in German Offenlegungsschriften (German Published Specifications) Nos. 1,570,533; 1,595,762; 2,116,974 and 2,113,347, British Patent Specification No. 1,079,821 and U.S. Pat. No. 3,544,514. Examples of some of the polyhydroxy compounds which can be used are phlorglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-([4,4-(4,4'-dihydroxydiphenyl) cyclohexyl]-propane, 2,4-bis-(4-hydroxyphenyl-4-isopropyl)-phenyl, 2,6-bis-(2'-hydroxy-5'-methyl-benzyl)-4-methyl-phenol, 2,4-dihydroxy-benzoic acid, 2-(4-hydroxyphenyl)-2-(2,4-dihydroxyphenyl)-propane and 1,4-bis-(4',4''-dihydroxytriphenylmethyl)-benzene.

The aromatic polycarbonates should as a rule have molecular weights $\overline{M}_w$ of about 10,000 to more than 200,000, preferably of about 20,000 to 80,000.

Small portions of low molecular weight polycarbonates having for example an average degree of polymerisation of 2 – 20 may be admixed with the high molecular weight polycarbonates with $\overline{M}_w$ of about 10 000 to 200 000. For instance a small proportion of admixed low molecular polycarbonate based on 2,2-bis-(3,5-dibromo-4-hydroxyphenyl)-propan can be used for improving the flame resistance.

Industrially the most important polycarbonates are polycarbonates based on bisphenol A. For many purposes, these are inadequately flame-proof. Thus, they have $O_2$ indices of only about 25% according to ASTM-D-2863/70.

Attempts have been made to achieve better flame resistance of the polycarbonate in various ways. Thus, higher flame resistance can be achieved by adding glass fibers. However, in that case the impact strength, notched impact strength and weathering resistance of the polycarbonate in general decline greatly. The polycarbonate can furthermore be rendered flame-proof by co-polycondensation with tetrachlorobisphenol A (2,2-bis-(3,5-dichloro-4-hydroxyphenyl)-propane). To achieve good flame resistance, these products must contain rather high proportions of units based on tetrachlorobisphenol, which reduces the flow of the polymer melt and substantially lowers the notched impact strength. In the case of copolycondensation with tetrabromobisphenol A (2,2-bis-(3,5-dibromo-4-hydroxyphenyl)-propane) good flame resistance can admittedly be achieved with lower proportions of this bisphenol but nevertheless this product also has disadvantages since it is easily degraded if it is processed thermoplastically under incorrect conditions, because of elimination of $Br_2$ and/or HBr, and can cause corrosion of the processing machinery.

It has now been found, surprisingly, that aromatic polycarbonates of the type described in detail above show exceptionally good flame resistance if sulphur is incorporated, while avoiding the abovementioned disadvantages of previously known flame-proof modifications of polycarbonates. Since sulphur is very readily compatible with polycarbonate, contents of sulphur of up to about 15% by weight can be worked into polycarbonates; however, amounts of up to about 7% by weight suffice to give high flame resistance.

The sulphur can be incorporated into the polycarbonates in various ways. Thus, for example, polycarbonate granules or polycarbonate powders can be mixed mechanically with sulphur and the mixtures can then be processed in the melt, at temperatures above 160° C, by means of mixing mills, extruders or kneaders.

The sulphur can however also be introduced directly into the polycarbonate melt. This succeeds because sulphur dissolves astonishingly quickly in polycarbonate and becomes homogeneously distributed therein so that pre-mixing can be dispensed with.

Polycarbonate-sulphur mixtures thus obtained, containing up to about 7% by weight of sulphur, are — surprisingly — homogeneous, completely transparent compositions.

The polycarbonate-sulphur mixtures containing more than 7% by weight of sulphur are no longer transparent but more or less turbid.

The polycarbonates which have been rendered flameproof by means of small proportions of sulphur show high flame resistance but no deterioration in the mechanical properties compared to polycarbonates not modified with sulphur. The mechanical properties are astonishingly good even at a fairly high sulphur content, which is attributable to the good compatibility. Thermal degradation of the polycarbonates, modified with sulphur, during thermoplastic processing does not occur to a greater extent than normal, and there is no lowering of the flow of the polymer melts. The injection moldings obtained show favorable resistance to dripping when exposed to a flame in accordance with the customary flame tests, and the weathering resistance of the polycarbonate containing sulphur is outstanding. No damage due to corrosion occurs during thermoplastic processing of the materials. Furthermore, the compositions have good tracking resistance and other good electrical properties.

The flame resistance of polycarbonates which have already been rendered flame-resistant (see above) can be greatly improved further by addition of small amounts of sulphur. Thus, for example, the flame resistance of copolycarbonates which contain co-condensed tetrachlorobisphenol A or tetrabromobisphenol A can be improved quite astonishingly with small proportions of sulphur.

The minimum amount of sulphur required in the polycarbonate molding compositions according to the invention is about 0.1% by weight, preferably about 0.5% by weight, based on polycarbonate + sulphur.

The polycarbonates modified with sulphur to render them flameproof can be converted very readily to moldings, sheets, fibers, coatings and other end products. They can also be used readily in mixtures with fillers, for example, minerals, wood flour, carbon black, carbon fibers, dyestuffs, pigments, heat stabilizers, UV stabilizers, antioxidants and other stabilizers, lubricants, plasticizers, mold release agents and other additives.

The compositions according to the invention consisting of polycarbonates, sulphur and up to 30% by weight of glass fibers, preferably with a content of about 2% by weight to 30% by weight of glass fibers, relative to the total mixture, should be singled out particularly.

The polycarbonate molding compositions according to the invention can in particular be employed where high or extremely high flame resistance is demanded, coupled with excellent mechanical and electrical properties.

EXAMPLES

The amounts of sulphur mentioned in the table are added to the granular polycarbonates mentioned in the table and the mixture is then converted to granules via the melt in an extruder at 250° – 280° C. This material is injection-molded to give test specimens on which the $O_2$ index is measured.

| Example | Polycarbonate | $\eta_{rel}$ | Sulphur (% by weight) | $O_2$ index in % |
|---|---|---|---|---|
| 1 | BPA-PC | 1.30 | 0 | 25 |
| 2 | BPA-PC | 1.30 | 1.2 | 32 |
| 3 | BPA-PC | 1.30 | 4.6 | 30 |
| 4 | BPA/TBBPA-CPC*) | 1.30 | 0 | 34 |
| 5 | BPA/TBBPA-CPC*) | 1.30 | 2.5 | 40 |
| 6 | BPA-PC with 30% of glass fibers | 1.30 | 0 | 33 |
| 7 | BPA-PC with 30% of glass fibers | 1.30 | 2.3 | 44 |

TBBPA = 2,2-bis-(3,5-dibromo-4-hydroxyphenyl)-propane
BPA = 2,2-bis-(4-hydroxyphenyl)-propane
$\eta_{rel}$ = (solution of 0.5 g of PC in 100 ml of $CH_2Cl_2$ at 25° C)
$O_2$ index = (ASTM-D-2863-70)
*) = copolycarbonate contains 6% by weight of bromine.

| | | | | Comparison of some mechanical and electrical properties | | | | | |
|---|---|---|---|---|---|---|---|---|---|
| Example | polycarbonate | $\eta_{rel}$ | sulphur (% by weight) | tensile stress at yield (DIN 53455) (MPa) | % elongation at yield (DIN 53455) | tensile strength (MPa) (DIN 53455) | elongation at break % (DIN 53 455) | E-modulus**) (MPa) | Impact strength (DIN 53 453 (KJ/m²) | tracking resistance* |
| 8 | BPA-PC | 1.305 | 1.3 | 67.6 | 6.3 | 62.9 | 106 | 2440 | not broken | 380 |
| 9 | BPA-PC | 1.294 | 4.6 | 73.3 | 6.1 | 66.4 | 109 | 2640 | " | 240 |
| 10 | BPA-PC | 1.275 | 10.9 | 69.4 | 5.3 | 54.3 | 97 | 2740 | " | 180 |
| 11 | BPA-PC | 1.26–1.32 | — | 58.8 | 7 | 63.7–68.7 | 80–120 | 2258 | " | 260 ± 20 |

*According DIN 53 480, July 1964, sample: 120 × 15 × 4 mm³, test voltage: 100 ... 400 volt, KB-method, text solution F.
**From the tensile test according to DIN 53 455

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Molding compositions consisting essentially of aromatic polycarbonates having molecular weights $\overline{M}_w$ of about 20,000 to 80,000 and about 0.5 to 7% by weight of sulphur, relative to the total weight of polycarbonate and sulphur.

2. Molding compositions according to claim 1, characterized in that they contain aromatic polycarbonates based on at least one of the following bisphenols: 4,4'- dihydroxydiphenyl, 4,4'-dihydroxydiphenyl-sulphide, 2,2-bis-(4-hydroxyphenyl)-propane, 2,4-bis-(4-hydroxhphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and/or 2,2-bis-(3,5-dibromo-4-hydroxyphenyl)-propane.

3. Molding compositions according to claim 1, characterized in that they contain copolycarbonates based on 2,2-bis-(4-hydroxyphenyl)-propane and one of the bisphenols 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane or 1,1-bis-(4-hydroxyphenyl)-cyclohexane.

4. Molding compositions according to claim 1, characterized in that they contain aromatic polycarbonates based on 2,2-bis-(4-hydroxyphenyl)-propane.

5. A molding composition comprising a blend of aromatic polycarbonates having molecular weights, $\overline{M}_w$, of about 10,000 to about 200,000 with about 0.5 to 7 wt. %, based on the total weight of the blend, of a flame retardant consisting of sulphur.

6. The molding composition of claim 5 wherein the polycarbonates have molecular weights $\overline{M}_w$ of about 20,000 to 80,000 and the blend contains about 0.5 to 7 wt.% sulphur based on the total weight of the blend.

7. The molding composition of claim 5 wherein the blend also contains a small proportion of a low molecular weight polycarbonate having average degrees of polymerization of about 2 to 20.

8. The molding composition of claim 7 wherein the low molecular weight polycarbonates are based on 2,2-bis-(3,5-dibromo-4-hydroxyphenyl)-propane.

9. A process for improving the flame resistance of polycarbonate molding compositions having molecular weights, $\overline{M}_w$, of about 10,000 to 200,000 comprising physically incorporating into the composition about 0.5 to 7 wt. %, based on the total weight of the composition, of a flame retardant consisting of sulphur.

10. The process of claim 9 wherein the sulphur is dissolved in a melt of the polycarbonate.

11. The process of claim 9 wherein the sulphur is mechanically mixed with polycarbonate granules or powders and the mixture is processed at temperatures in excess of about 160° C to produce a homogeneous blend.

12. The product of the process of claim 9.

13. A process for improving the flame resistance of polycarbonate molding compositions consisting essentially of physically incorporating about 0.5 to 7 wt % of sulphur, based on the total weight of the composition, into the composition.

14. Molding compositions consisting essentially of aromatic polycarbonates having molecular weights $\overline{M}_w$ of about 20,000 to 80,000, about 0.5 to 7% by weight of sulphur, relative to the total weight of polycarbonate and sulphur, and up to 30% by weight 15. Molding compositions based on aromatic polycarbonates having molecular weights $\overline{M}_w$ of about 20,000 to 80,000 containing about 0.5 to 7% by weight of sulphur, based on the total weight of polycarbonate and sulphur, and no additional additives having a substantial effect on the flame retardancy of the composition.

16. Molding compositions based on aromatic polycarbonates having molecular weights $\overline{M}_w$ of about 20,000 to 80,000 containing about 0.5 to 7% by weight of sulphur, based on the total weight of polycarbonate and sulphur, up to 30% by weight of glass fibers relative to the total mixture and no additional additives having a substantial effect on the flame retardancy of the composition.

17. A molding composition comprising a homogeneous blend of aromatic polycarbonates having molecular weights, $\overline{M}_w$, of about 20,000 to 80,000 based upon bisphenols selected from the group consisting of 2,2-bis-(3,5-dibromo-4-hydroxyphenyl)-propane and 2,2-bis-(4-hydroxyphenyl)-propane and about 0.5 to 7 wt. %, based on the total weight of the composition, of a flame retardant consisting of sulphur.

* * * * *

UNITED STATES PATENT AND TRADEMARK OFFICE
CERTIFICATE OF CORRECTION

PATENT NO. : 4,100,130
DATED : July 11, 1978
INVENTOR(S) : Dieter Freitag, Werner Nouvertné

It is certified that error appears in the above—identified patent and that said Letters Patent is hereby corrected as shown below:

Column 1, line 55 delete "hydroropane" and insert--hydroxyphenyl--propane".

Column 2, line 18 remove the opening parenthesis from the formula "2,2-bis([4,4-(4,4'etc.

Claim 1 which at the present time begins at line 68, column 3 and continues at line 64 of column 4 should be more clearly presented so that it reads:

"Molding compositions consisting essentially of aromatic polycarbonates having molecular weights $\overline{M}_w$ of about 20,000 to 80,000 and about 0.5 to 7% by weight of sulphur, relative to the total weight of polycarbonates and sulphur."

Claim 14 add --of glass fibers relative to the total mixture-- after "30% by weight".

Column 4, lines 64-66 should be deleted.

Signed and Sealed this

Twenty-first Day of September 1982

[SEAL]

Attest:

GERALD J. MOSSINGHOFF

Attesting Officer

Commissioner of Patents and Trademarks